United States Patent [19]

Horn

[11] 4,386,641
[45] Jun. 7, 1983

[54] RETRACTABLE CANT SUPPORTS FOR LUMBER CANT POSITIONER-FEEDERS

[75] Inventor: James N. Horn, Seattle, Wash.
[73] Assignee: Saab-Scania Aktiebolag, Sweden
[21] Appl. No.: 261,874
[22] Filed: May 8, 1981
[51] Int. Cl.³ .................................. B27B 31/00
[52] U.S. Cl. ........................... 144/329; 144/245 A;
144/357; 198/457; 198/586
[58] Field of Search .......... 144/245 R, 245 A, 245 B,
144/242 R, 357, 329; 198/457, 586

[56] References Cited

U.S. PATENT DOCUMENTS

| | | |
|---|---|---|
| 1,824,381 | 9/1931 | Sorensen et al. |
| 3,785,416 | 1/1974 | Anthony .................... 144/245 A |
| 3,890,509 | 6/1975 | Maxey ......................... 250/561 |
| 4,106,538 | 8/1978 | Sigfridsson et al. .......... 144/357 X |
| 4,174,774 | 11/1979 | Bourgeois ..................... 198/457 |
| 4,240,477 | 12/1980 | Horn et al. ................. 144/245 R |

Primary Examiner—W. D. Bray
Attorney, Agent, or Firm—David L. Garrison

[57] ABSTRACT

A method and apparatus for retractably supporting lumber cants above feed chains in a cant positioner-feeder for locating the cant in a position to optimize lumber yield. The cants are supported with retractable cant supports interpositioned between the feed chains. The retractable cant supports may be movably mounted so that longitudinal motion is imparted to the cant as the cant supports are retracted, thereby reducing the relative velocity between the cant and feed chains.

9 Claims, 6 Drawing Figures

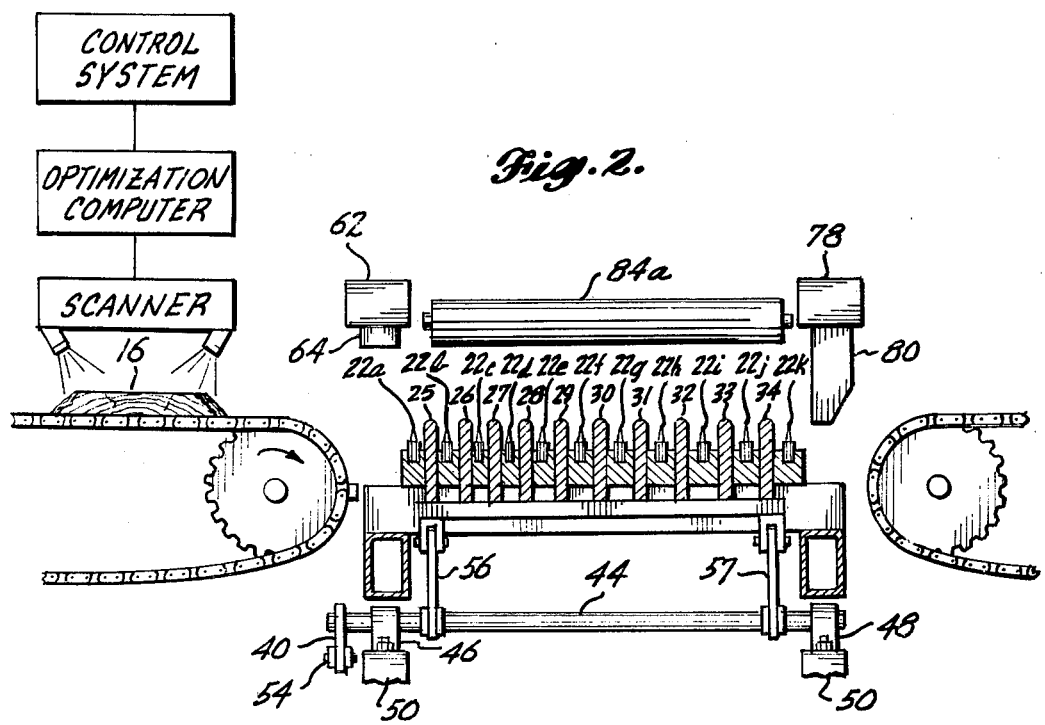
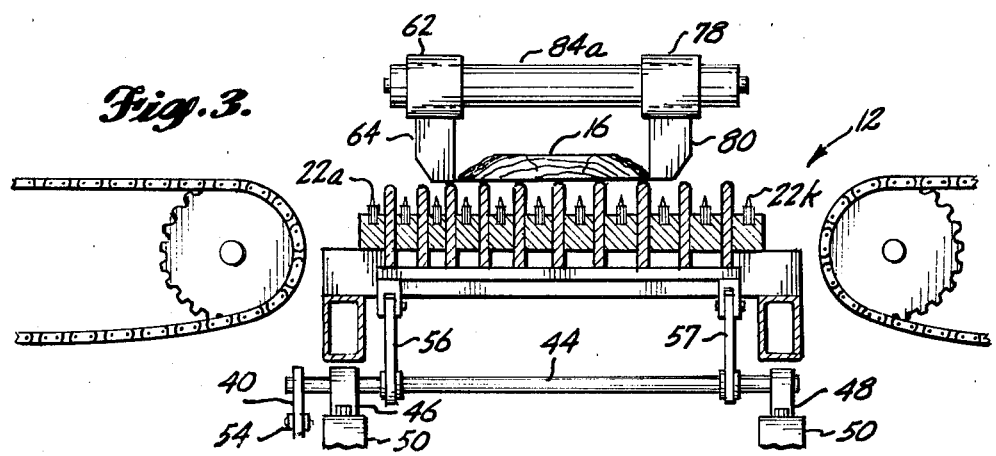
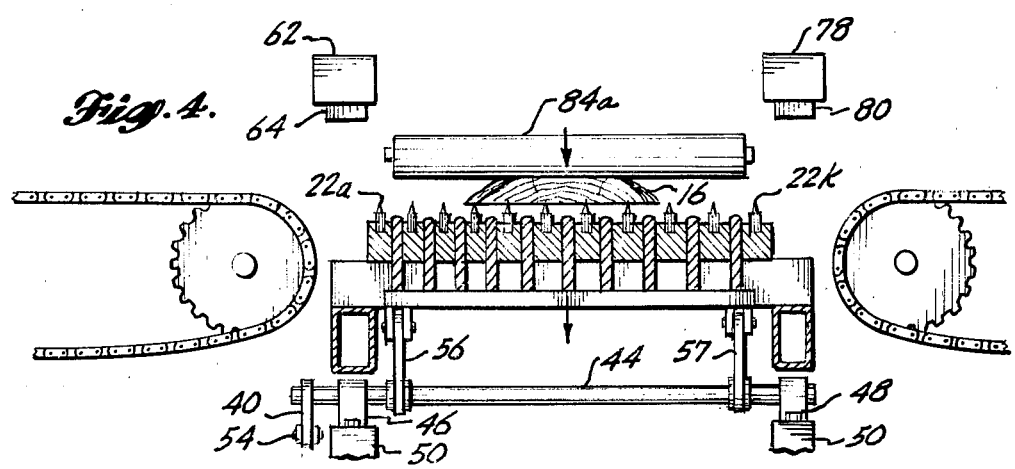

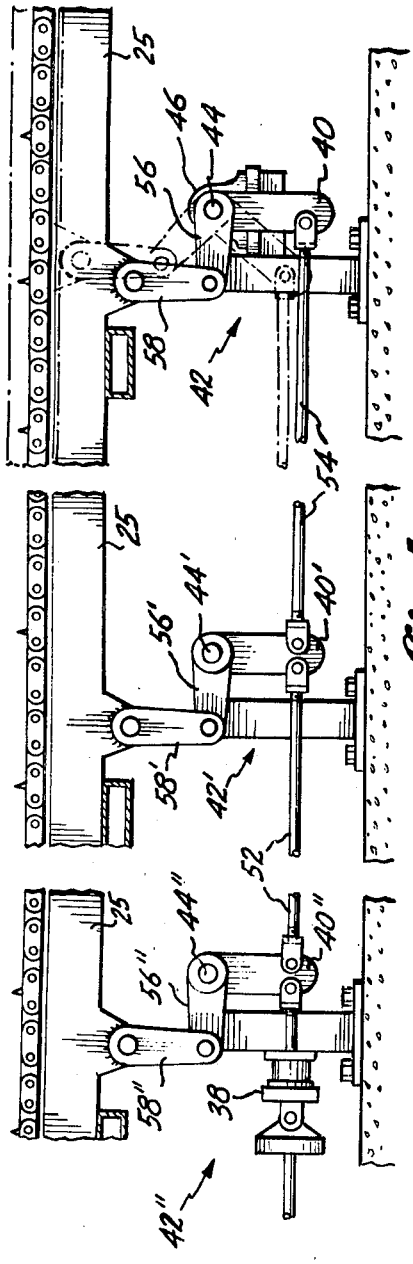
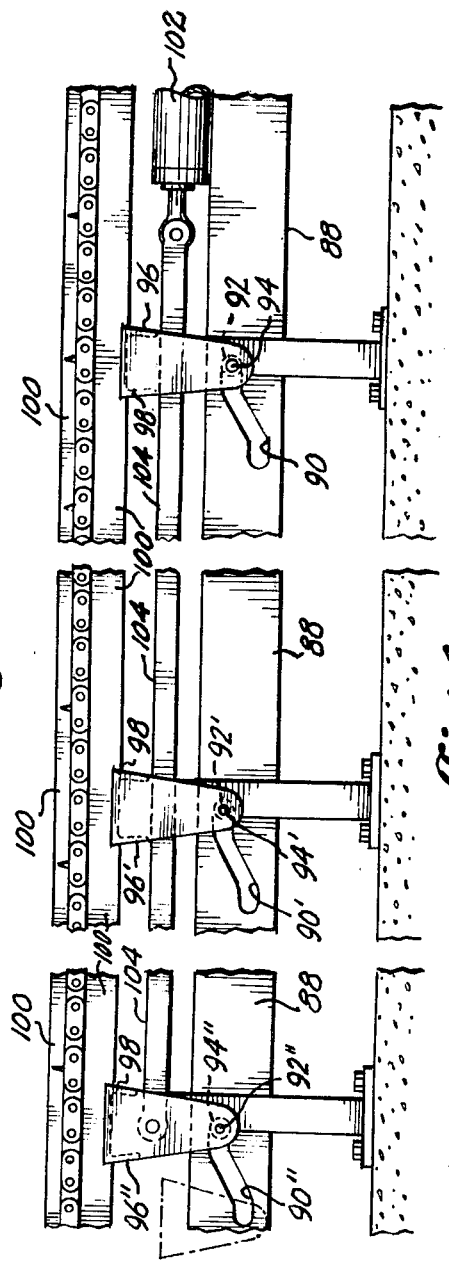

RETRACTABLE CANT SUPPORTS FOR LUMBER CANT POSITIONER-FEEDERS

DESCRIPTION

1. Technical Field

This invention relates to lumber handling equipment. Specifically it relates to positioner-feeders used to position and feed lumber cants into edgers or saws. This invention is an apparatus and method for supporting and feeding lumber cants with such positioner-feeders.

2. Background Art

Logs are made into lumber by initially cutting them into large boards termed cants. Cants have flat sawn surfaces and curved and bark covered surfaces called wanes. Cants are located on positioner-feeders where they are precisely positioned relative to edgers, saws or chippers. The positioner-feeder then feeds the positioned cant into these edgers, saws or chippers where the cants are made into rough lumber and wood chips. Modern positioner-feeders are used in conjunction with optical scanning systems which obtain precise information on the size of each cant, its shape and the presence and location of wanes, cracks, knots and other imperfections. This information is fed into a computer where it can be used with other relevant parameters to compute an optimal cutting design for that cant. Maxey discloses one such optical scanning system in U.S. Pat. No. 3,890,509. The positioner-feeder and the associated edger are coordinately controlled by the computer to effectuate this optimal cutting design.

This invention relates specifically to the means and method by which cants are supported and fed by the positioner-feeder. Sorenson et al disclosed one positioner-feeder in U.S. Pat. No. 1,824,381. In the Sorensen device the cant rests on a stationary feed table. A catch or jaw extends from a feed chain to engage the bottom of the cant and move it into an edger. A similar type of positioner-feeder is shown in U.S. Pat. No. 4,106,538 by Sigfridsson et al. Therein the feed chain has dogs which extend through a slot in the feed table to engage the cant. The dogs are extended through the stationary feed table by a movable chain guide which forces the slack chain upward. Horn et al show in U.S. Pat. No. 4,240,477, another positioner-feeder which uses a feed chain assembly which is moved into contact with the cant. The feed chain assembly is extended through a slot in the stationary feed table.

One problem associated with prior art positioner-feeders is the breakage of feed chains caused by the sudden engagement of the moving chains with the cant. This sudden engagement also causes damage to the cant. Another problem associated with prior art feed chain arrangements are the complex mechanisms necessary when the moving feed chain assembly must itself be moved to engage the cant with the feed chain dogs.

DISCLOSURE OF INVENTION

This invention includes an apparatus and method for retractably supporting lumber cants away from the moving feed chains of a positioner-feeder. The invention also includes an apparatus and method for imparting longitudinal motion to the cants before the supports are retracted and the cants engage the feed chains.

The apparatus includes a feed table having a plurality of feed chains. These endless feed chains are arranged around sprockets so that the feed chains are substantially parallel. A portion of each chain is positioned along the feed table so that they form a planar surface for engaging the cants.

Interposed between the feed chains are a plurality of cant supports. These cant supports are extended to support a cant away from the feed chains so that a cant can be laterally positioned on the feed table. The cant supports are smooth and rounded to facilitate the transverse sliding and positioning of the cant. The preferred embodiment uses elongated bars but other configurations such as smooth rounded pins are also possible. When the cant is properly positioned, hold-down rollers engage the cant forcing it into firm contact with the cant supports. The cant supports are retracted into the feed table thereby allowing the cant to be forced into engagement with the moving feed chains. The hold-down rollers stabilize the cant and force it into firm engagement with the feed chains preventing it from twisting and slipping as it is engaged and fed from the positioner-feeder into the edger, chipper or saw.

The retractable cant supports are preferably mechanically mounted so that the cant supports move longitudinally in the direction of the feed chains as the cant supports are retracted. This longitudinal motion of the cant supports imparts a corresponding motion to the cant thereby reducing the relative velocity between the moving feed chains and the cant which is engaging them. This reduced relative velocity helps prevent chain breakage and damage to the cants compared to devices which suddenly engage the cant with the moving feed chains.

The mechanisms for accomplishing this combined retraction and longitudinal motion of the cant supports are numerous. One such mechanism uses a set of shafts rotatably mounted to the feed table frame. Nonrotatably connected to these shafts are levers which are rotatably connected to the cant supports or an extension thereof. The levers are oriented on the shafts in a coordinated manner so that a rotation of the shafts causes a simultaneous retraction and longitudinal movement of the cant supports.

One alternative mechanism for imparting the combined motion to the cant supports uses a linear cam arrangement. In this arrangement the cant supports are mounted on a movable frame. Between this movable frame and the stationary feed table frame are a linear cam and associated cam followers. When the movable frame is moved relative to the stationary feed table frame the rolling interaction between the cam followers and linear cam forces the movable frame into the combined retraction and longitudinal motion.

It is an object of this invention to provide a means for supporting a cant away from moving feed chains thereby allowing the supported cant to be precisely positioned relative to an edger, chipper or saw. It is an object of this invention to support the cant away from the feed chains and to engage the cant with the feed chains without transversely moving the feed chain assembly. It is another object of this invention to impart longitudinal motion to the supported cant in the same direction as the movement of the feed chains as the cant supports are retracted. It is also an object of this invention that the retractable cant supports be usable with positioner-feeders having optical scanning means and computer assisted control means for optimizing the yield of usable lumber.

BRIEF DESCRIPTION OF DRAWINGS

FIG. 2 is an end view of the positioner-feeder of FIG. 1 with parts omitted for clarity of presentation.

FIG. 3 is the apparatus of FIG. 2 with the cant repositioned onto the cant supports.

FIG. 4 is the apparatus of FIG. 2 and FIG. 3 with the cant supports retracted and the cant being fed by the feed chains.

FIG. 5 is a side elevational view of one embodiment of the mechanism for retracting and longitudinally moving the cant supports.

FIG. 6 is a side elevational view of another embodiment of the mechanism for retracting and longitudinally moving the cant supports.

BEST MODE OF CARRYING OUT THE INVENTION

Figure 1:
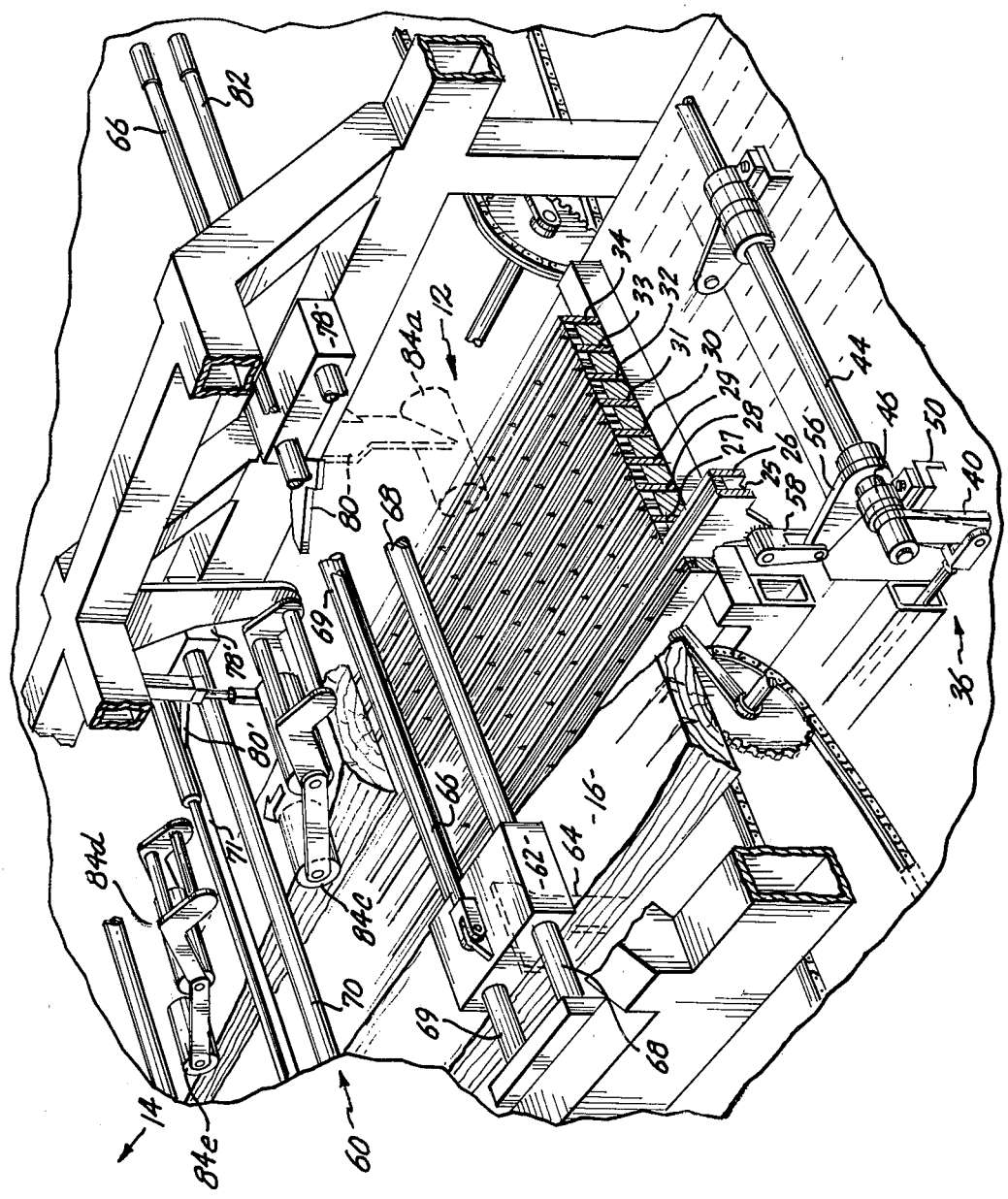
FIG. 1 is a perspective view of the positioner-feeder with a cant located thereon. Portions of the feed table and of the positioner have been removed for clarity.

Referring now to the figures, wherein like numerals refer to like parts, a perspective view of the positioner-feeder is shown in FIG. 1 and end elevational views are shown in FIGS. 2, 3 and 4. A first cant 10 has been positioned on the feed table 12 and is being fed into edger 14. A second cant 16 is positioned adjacent the feed table 12. Cant 16 has been scanned at a scanning location (shown in FIG. 2) to determine its wane and defect locations.

After the first cant 10 has been fed from the feed table 12 by the plurality of feed chains 22a–22k, the feed table is clear and ready to receive second cant 16. Before second cant 16 is repositioned onto the feed table 12 cant supports 25 through 34 are extended above the feed chains 22a–22k to prevent engagement of the second cant 16 with the feed chains 22a–22k. Cant supports 25–34 are interpositioned between the feed chains 22a–22k. Cant supports 25–29 are positioned more closely together than the remaining cant supports 30–34 to provide greater stability for smaller cants. Cant supports 25–34 are extended and retracted by a lifting means 36.

Lifting means 36 is shown in side elevation view in FIG. 5. It can be seen from FIG. 5 that lifting means 36 has a lifting means actuator 38 which can be hydraulic ram or pneumatic ram. FIG. 3 also shows that lifting means 36 has three lifting units 42, 42' and 42". Each of the three lifting units has a shaft 44, 44' and 44". Shafts 44, 44' and 44" are supported by bearings 46 and 48 as shown in FIG. 1 for shaft 44. Bearings 46 and 48 and their counterparts on the other two lifting units are supported by the feed table frame 50.

Lifting means 36 is operated when lifting means actuator 38 moves through a linear displacement. This linear motion directly imparts a rotational motion to lifting actuator arm 40" on lifting unit 42". Lifting actuator arm 40" is connected to a connecting rod 52 which transmits the movement of lifting means actuator 38 to rotate lifting actuator arm 40'. Similarly, lifting actuator arm 40' transmits movement to connecting rod 54 which imparts a rotational movement to lifting actuator arm 40. Thus when lifting means actuator 38 is operated there is a substantially equal rotational motion in lifting actuator arms 40, 40' and 40". This rotational motion is imparted to shafts 44, 44' and 44". The rotational motion of shafts 44, 44' and 44" is transmitted to lifting levers 56, 56' and 56". Lifting levers 56, 56' and 56" are rotatably connected to lifting lugs 58, 58' and 58" which are rigidly connected to cant supports 25–34.

From the above description of the lifting means 36 it can be seen that an axial retraction in lifting means actuator 38 causes an extension of cant supports 25–34 and also causes cant supports 25–34 to move longitudinally in a direction opposite to the direction in which feed chains 22a–22k are moving. Conversely an extension of lifting means actuator 38 causes a retraction of cant supports 25–34 and a longitudinal motion in the direction of motion of the feed chains 22a–22k.

Now considering the progress of second cant 16 through the positioner feeder, as shown in FIG. 1, we see two positioner clamping means 60 and 60'. Positioned along the outward side of second cant 16 are first engagement means 62. First engagement means 62 has first engagement means tang 64 which engages second cant 16. Second cant 16 is repositioned onto the feed table 12 when first engagement means actuator 66 is retracted. This retraction causes first engagement means 62 to slide along ways 68 and 69. A corresponding motion occurs in another first engagement means 62' (not shown) for positioner clamping means 60' upon ways 70 and 71.

Referring to FIGS. 1, 2 and 3, second cant 16 is repositioned onto feed table 12 with cant supports 25–34 extended so as to support second cant 16 above feed chains 22a–22k. Second cant 16 is engaged by both first engagement means 62 and 62' (not shown) and second engagement means 78 and 78'. Actual contact of second cant 16 occurs through first engagement means tangs 64 and 64' (not shown), and through second engagement means tangs 80 and 80'. First engagement means 62 is moved by first engagement means actuator 66. Second engagement means 78 is moved by second engagement means actuator 82. Both first and second engagement means slide on ways 68 and 69. Positioner clamping means 60' is similarly constructed. By moving the first engagement means 62 and 62' (not shown) in a coordinated fashion with second engagement means 78 and 78', second cant 16 is positioned to a desired location on feed table 12.

Rollable hold-down means 84a–84e engage the top of cant 16 after second cant 16 has been properly positioned on feed table 12. Hold-down means 84a–84e force cant 16 against cant supports 25–34. Cant supports 25–34 are then retracted through the action of lifting means 36 as discussed above, as shown in FIG. 4. Cant supports 25–34 simultaneously move longitudinally as they retract, thereby imparting a longitudinal motion to second cant 16 in the same direction as the movement of feed chains 22a–22k. The motion thus imparted to second cant 16 provides it with a velocity closer to that of feed chains 22a–22k when second cant 16 engages feed chains 22a–22k. This smaller relative velocity reduces twisting and misalignment of the cant, and helps prevent chain breakage and damage to the cant which would occur if a stationary cant suddenly engaged feed chains 22a–22k. Hold-down means 84a–84e also force cant 16 into positive engagement with feed chains 22a–22k to prevent slippage and misalignment of the cant as it is fed. First engagement means tangs 64 and 64' (not shown) and second engagement means tangs 80 and 80' rotate up out of the path of second cant 16 as it is being fed from the feed table 12.

After the cant engages feed chains 22a–22k it travels down the feed table 12 and proceeds into the edger 14 as shown in FIG. 1. The process is repeated as outlined above for each cant which is positioned and fed by the positioner-feeder.

Referring now to FIG. 6, we see an alternative embodiment for the lifting means. In this alternative embodiment lifting means 86 is comprised of a linear cam 88 with openings 90, 90' and 90". Positioned within openings 90, 90' and 90" are rolling cam followers 92, 92' and 92". These rolling cam followers are mounted on cam follower shafts 94, 94' and 94" which are supported in lifting yokes 96, 96' and 96". Lifting yokes 96, 96' and 96" are constructed so that both ends of cam follower shafts 94, 94' and 94" are supported by the two legs of each yoke. Lifting yokes 96, 96' and 96" are mounted to a cant support frame 98 upon which the cant supports 100 are mounted. FIG. 6 shows one side of the lifting means which is supported on feed table frame 50. It is preferable to have two such linear cam arrangements, one along each side of feed table 12.

Lifting means actuator 102 provides the driving force for lifting means 86. Lifting means actuator 102 is preferably a hydraulic or pneumatic ram which is rotatably connected to connecting link 104, which is in turn rotatably connected to connecting shaft 106 running between lifting yoke 96" and its counterpart on the opposite side of the lifting means 86.

It is preferable that the positioner-feeder be operated with an optical scanning means and a computer means having an optimization program. The optical scanner collects data concerning the shape and size of the cant which is being worked upon. The size and extent of wanes on the cant are also detected and supplied to the computer means. With this data the computer means seeks to maximize revenue from a cant by considering a number of relevant parameters including the species of log which is being produced, the grades of lumber and their associated prices, the allowable imperfections for the various grades of lumber, the total number of products which the mill seeks to produce, the value of chips which may be produced from the log, splitter charges, operator input and a demand for particular types of lumber which the mill may be experiencing at any particular time. With these relevant parameters the computer optimization program determines an optimum cutting design. This optimum cutting design has an optimum position for a cant on the feed table and an optimum action by the edger 14.

INDUSTRIAL APPLICABILITY

The cant support devices of this invention are for use with modern positioner-feeders including those having optical scanners and computerized control systems. Positioner-feeders incorporating these cant support devices are used with a wide variety of cant supplying equipment and edgers, chippers or gang saws.

From the above disclosure it will be apparent to persons skilled in the pertinent art that alterations can be made consistent with the inventive concepts taught herein.

What is claimed is:

1. A feed table means for a lumber cant positioner-feeder, comprising:
   a feed table frame;
   a plurality of feed chain means movably arranged across said feed table frame to provide a movable surface for engaging and moving cants; and
   retractable cant support means interpositioned between at least some of said feed chain means for supporting a cant away from said feed chains while the cant is being positioned thereon, said cant support means being retractable between said feed chain means thereby allowing a supported cant to be engaged and moved by said feed chain means.

2. The feed table means of claim 1 further comprising:
   lifting means for movably supporting said cant support means;
   said lifting means being capable of moving said cant support means in combined motions of retraction-extension and longitudinal translation, so that a cant positioned on said cant support means is imparted with longitudinal motion in the direction of the moving feed chains as the cant support means are retracted between said feed chain means.

3. The feed table means of claim 2 wherein said cant support means are interpositioned between substantially all of said feed chain means.

4. The feed table means of claim 3 wherein said cant support means are spaced more closely together along one side of said feed table frame to provide increased support for relatively small sized cants being positioned thereon.

5. The feed table means of claim 2 wherein said lifting means further comprises:
   at least two shafts rotatably mounted to said feed table frame;
   a lifting means actuator for causing said shafts to rotate;
   at least one lifting lever nonrotatably mounted on each of said shafts;
   said lifting lever being rotatably connected to an assembly including said cant support means and any supporting and connecting framework therefor.

6. The feed table means of claims 1 or 2 wherein said cant support means are elongated bars.

7. A method for handling a cant of lumber comprising:
   receiving a cant from a cant delivering device to a position adjacent to the feed table of a cant positioner-feeder;
   moving said cant laterally onto said feed table whereon cant support means are extended between a plurality of moving feed chain means to support said cant away from said feed chain means;
   positioning said cant on said feed table with respect to an edger means positioned to receive said cant longitudinally to optimize the yield of lumber from said cant; and
   retracting said board support means to engage said cant with said feed chain means thereby moving said cant longitudinally into said edger means.

8. The method of claim 7 further including:
   moving said cant longitudinally with longitudinally movable cant support means before engagement of the cant with said feed chains, thereby reducing the relative velocity between said feed chains and said cant.

9. The method of claims 7 or 8 further including:
   engaging said cant with a rollable hold-down means before said cant support means are retracted to force said cant into firm contact with said cant support means and said feed chains thereby preventing slippage and misalignment.

* * * * *